Feb. 13, 1934.     F. J. KAHLE ET AL     1,946,858
ADJUSTABLE FRONT AXLE FOR AUTOMOBILES AND THE LIKE
Filed April 13, 1931
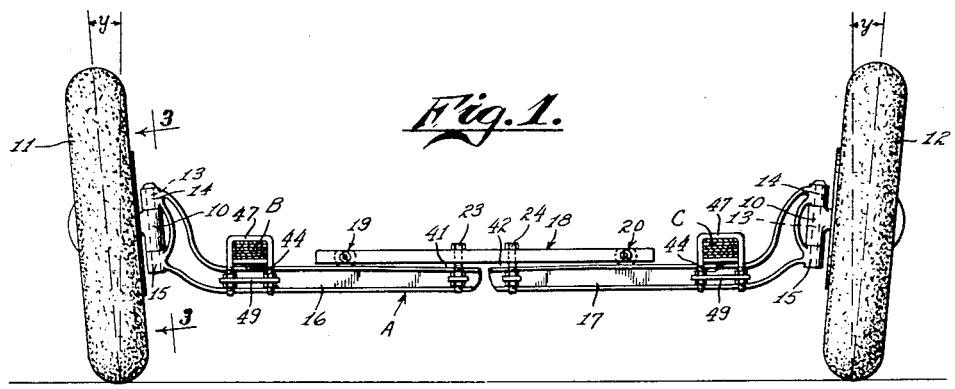
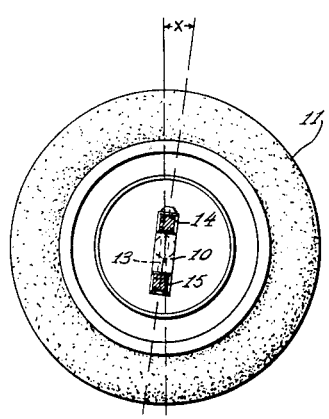
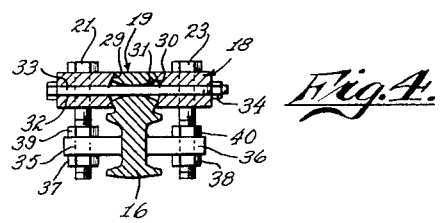
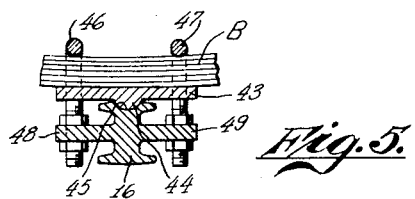
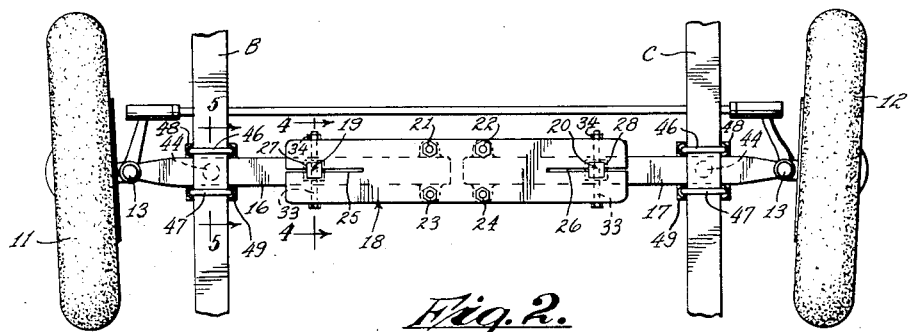
Inventor
FRANK J. KAHLE
RUDOLPH W. BAER Patented Feb. 13, 1934

1,946,858

UNITED STATES PATENT OFFICE 1,946,858

ADJUSTABLE FRONT AXLE FOR AUTOMOBILES AND THE LIKE

Frank J. Kahle, Huntington Park, and Rudolph W. Baer, Los Angeles, Calif.

Application April 13, 1931. Serial No. 529,664

11 Claims. (Cl. 280—95)

This invention relates to the provision of means for adjusting the front wheels of an automobile, and the like, and deals particularly with an improved front axle for vehicles of this type.

In vehicles, such as automobiles and the like, it is known that the front axles have three variable characteristics which may be defined as caster, camber, and toe-in.

The term "caster" is used to designate the angle of the steering axis of the wheel with respect to a vertical plane parallel to the front axle, and the term "camber" is used to designate the angle of a vertical diameter of the wheel with respect to a vertical plane perpendicular to the axle.

In order to obtain the best results with respect to maximum tire wear and flexibility of steering, it is necessary to have all three characteristics in proper relation.

This invention deals with means for adjusting the caster and the camber; the toe-in ordinarily being taken care of by the connecting rod between the two wheels.

Briefly stated, the invention consists in dividing the front axle of a vehicle of the character described into two parts, and interconnecting the parts in such a manner that the opposite ends of the axle may be moved relative to each other. With such an arrangement it is clear that separate adjustments may be obtained upon the front wheels for both caster and camber. This is clearly an improvement over a solid axle, which, either due to inaccuracy in manufacture or to use, may become twisted, and thus throw the opposite wheels out of adjustment.

In practice, where the front wheels are out of adjustment, it is necessary to either remove the axle and heat treat it for straightening, or to heat treat it in place and straighten it by special means. With my invention it is a simple matter to bring the opposite wheels into proper adjustment by moving the opposite ends of the axle relative to each other. Accordingly, it becomes the objects of this invention:

To provide means in a front axle for vehicles of the character described for moving opposite ends of the axle relative to each other;

To provide an axle composed of two parts having means for adjustably interconnecting the parts; and To provide means in an automobile for independently or jointly adjusting the caster and the camber of the front wheels.

Other objects and advantages will become apparent as the description proceeds in conjunction with the drawing, in which—

Fig. 1 is a front view partly in section of the front axle of an automobile;

Fig. 2 is a plan view of the same;

Fig. 3 is a view taken on line 3—3 of Fig. 1;

Fig. 4 is a sectional view taken on line 4—4 of Fig. 2; and

Fig. 5 is a sectional view taken on line 5—5 of Fig. 2.

Referring to the drawing, which, for purposes of simplicity, show only the front axle arrangement of an automobile, A designates generally a front axle having wheels 11 and 12 mounted on opposite ends thereof. The wheels 11 and 12 are mounted in the usual manner, which comprises a king-pin 13 passing through hubs 14 and 15 on the axle A, and a hub 10 upon the wheels.

In mounting wheels of this nature, there is a certain angle which must be given to the caster, and another certain angle which must be given to the camber.

In Fig. 1 I have designated the angle of camber by Y, and in Fig. 3 the angle of caster by X. Since these terms have been previously explained, such designation will be readily understood.

It is to be understood that both wheels are mounted in identical manner. The axle also carries springs B and C which are adapted to support the body of an automobile, not shown, and are mounted upon the axle in a novel manner to be more explicitly described hereinafter. The axle A is divided into sections 16 and 17, which are interconnected in a novel manner by a plate generally designated 18. Referring to the plate 18 for more explicit description, it will be seen to be mounted upon the axle A by means of lugs 19 and 20, which are an integral part of the axle and bolts 21, 22, 23, and 24. The plate 18 is slotted at opposite ends, as shown at 25 and 26, and the slots are recessed to form openings 27 and 28 adapted to receive the lugs 19 and 20, respectively.

As best illustrated in Fig. 4, the lug 19 is rounded on opposite sides, as shown at 29 and 30, and the recess 27 is also rounded correspondingly to form a limited universally movable fit therewith. The lug 19 is also provided with a hole 31 passing therethrough, and the hole expands outwardly from the central portion thereof toward both ends. The plate 18 is also provided with a hole 32 passing transversely of the plate 18, which hole coincides with the hole 31. After the plate 18 has been snapped into position over the lug 19 by means of the curved portions 29 and 30, a bolt 33 is inserted through the holes 32 and 31, and the bolt is drawn up by means of a nut 34. This serves to tighten the plate about the lug 19 and yields a rigid connection. It is to be understood that the same arrangement is used between the plate 18 and the lug 20. The ends of the sections 16 and 17 of the axle A are held in fixed relation with the plate 18 by means of the bolts 21, 22, 23, and 24.

As shown in Fig. 4, the bolts 21 and 23 are secured to the plate 18 on opposite sides of the axle section 16, and are attached to the axle 16 by means of lugs 35 and 36, respectively. Any conventional means for tightening the bolts in place may be used. In this instance, we have shown nuts 37 and 38 below the lugs 35 and 36, and lock nuts 39 and 40 above the lugs. With the arrangement of the bolts 21 and 23, it is possible to turn the axle slightly relative to the plane of the plate 18. It is obvious that the rounded portions 29 and 30 of the lug 19, and the tapered hole 31, will permit such movement, and will also form a rigid connection when tightened. This adjustment is taken advantage of to adjust the caster of the front wheels. Means is also provided for adjusting the camber of the front wheels. For this purpose, the sections 16 and 17 are provided with tapered end portions which leave spaces 41 and 42 between the plate 18, and the ends of the sections, respectively. This space permits that the ends of the sections 16 and 17, by means of the bolts 21, 23, and 22, 24, respectively, may be moved toward or away from the plate. It is obvious that such movement at the ends of the axles 16 and 17 will change the camber of the wheels 11 and 12. In order to permit the movements of the axle sections as described above, it is necessary to provide a universal mounting of the springs B and C upon the sections 16 and 17, respectively. For this purpose, we provide a plate 43 which is adapted to support the spring B upon the axle 16. The plate 43 is equipped with a segment of a ball 44, which is adapted to seat in a socket 45 in the axle. The ordinary U-bolts 46 and 47 are utilized to hold the spring in position upon the plate 43, and are attached to the axle in any conventional manner; in this instance lugs 48 and 49 being shown. It is clear that this type of mounting will permit the two movements of the axle 16 heretofore described.

In adjusting the caster of the front wheels, which is designated as the angle X in Fig. 3, the procedure is as follows: The nuts on the U-bolts 46 and 47 are first loosened, and the nut 34 on the bolt 33 is also loosened. It then becomes a matter of tightening or loosening the nuts on the bolts 21 and 23 to change the relation of the section 16 relative to the plate 18. After the proper adjustment has been obtained, the nuts are again tightened and the shaft becomes a rigid member. It is obvious that this adjustment may be applied to either wheel.

In adjusting the camber of the front wheels, which is designated as Y in Fig. 1, the nuts on the U-bolts 46 and 47 are loosened, and the adjustment is made by tightening or loosening the nuts on the bolts 21 and 23 in a manner to bring the end of the section 16 into closer relation, or a more spaced relation, relative to the plate 18. In this adjustment, if the caster is not at the same time being adjusted, it is important that the nuts on the bolts 21 and 23 be loosened or tightened equal amounts. After the adjustment has been made, the nuts on the U-bolts 46 and 47 are again tightened, and the shaft will become a rigid member. It is noted in this latter adjustment that the bolt 33 is not loosened, since the connection between the plate 18 and the lug 19 is of a universal nature and permits such movement. With an axle of this character, it is possible to quickly and accurately make all adjustments for camber and caster without heat treating or removing the axle from the car. An axle of this nature has all the qualities relative to rigidity and strength, requisite in automobile axles, and fulfills a demand for an adjustable front axle in vehicles of this type.

We claim as our invention:

1. For use in an automobile or the like: a front axle divided into two sections, each having a wheel-supporting spindle on its outer end; means including a connection plate for rigidly connecting said sections; and means for angularly adjusting each of said sections relative to the other.

2. For use in an automobile and the like: a front axle divided into two sections and means for adjustably connecting said sections, said means including a joining means for the inner ends of said axle sections; and means associated with said joining means and said axle sections for angularly adjusting the inner ends of said axle sections relative to each other.

3. For use in an automobile and the like: a front axle adapted to support the front springs of the automobile, said axle being divided into two sections; means for adjustably supporting said springs upon said axle sections; and means for adjustably connecting the two sections of said axle, said last mentioned means including a joining plate and means connecting the inner ends of said axle sections to said plate, in various predetermined positions of angular adjustment.

4. For use in an automobile and the like: a front axle adapted to support the front springs of the automobile, said axle being divided into two sections; means for adjustably supporting said springs including a ball and socket supporting means between said springs and said axle sections; and means for adjustably connecting the two sections of said axle.

5. For use in an automobile and the like: a front axle adapted to support the front springs of the automobile, said axle being divided into two sections; means for adjustably supporting said springs including a ball and socket supporting means between said springs and said axle sections; and means for adjustably connecting the two sections of said axle, said last mentioned means including a joining plate and means for adjustably connecting the inner ends of said sections to said plate.

6. For use in an automobile or the like, a front axle embodying: two sections; a connecting plate for securing said sections together; recesses in the end portions of said connecting plates; lugs on intermediate portions of said axle sections extending into said recesses; and means for adjustably securing the inner ends of said axle sections to said connecting plate.

7. For use in an automobile or the like, a front axle embodying: two sections; a connecting plate for securing said sections together; recesses in the end portions of said connecting plates; lugs on intermediate portions of said axle sections extending into said recesses; and means comprising lugs on the inner ends of said axle sections and bolts extending through a mid-portion of said connecting plate and engaging said lugs for adjustably securing the inner ends of said axle sections to said connecting plate.

8. For use in an automobile or the like, a front axle embodying: two sections; a connecting plate for securing said sections together; recesses in the end portions of said connecting plates; lugs on intermediate portions of said axle sections extending into said recesses; and means comprising a pair of oppositely disposed lugs on the inner end of each axle section and bolts extending through the mid-portion of said connecting plate and engaging said last named lugs for adjustably securing the inner ends of said axle sections to said connecting plate.

9. For use in an automobile or the like, a front axle embodying: two sections; a connecting plate for securing said sections together; recesses in the end portions of said connecting plates; lugs on intermediate portions of said axle sections extending into said recesses; means for securing said lugs in said recesses and means for adjustably securing the inner ends of said axle sections to said connecting plate.

10. For use in an automobile or the like, a front axle embodying: two sections; a connecting plate for securing said sections together; universal means connecting the end portions of said connecting plate to intermediate points on said axle sections respectively; and adjustable means for securing the inner ends of said axle sections to the mid-portion of said connecting plate.

11. For use in an automobile and the like: a front axle adapted to support the front springs of the automobile, said axle being divided into two sections; springs mounted on said axle sections; means for universally adjusting said springs relative to said axle sections; and means for adjustably connecting the two sections of said axle, said means for universally adjusting the springs consisting of a plate under the springs, a ball segment formed on said plate, said axle having a socket to receive said ball segment, and bolts on said axle engaging said springs.

FRANK J. KAHLE.
RUDOLPH W. BAER.